United States Patent [19]
Caldwell

[11] 3,833,176
[45] Sept. 3, 1974

[54] DRIP EMITTER DEVICE

[76] Inventor: Knox V. Caldwell, Rt. 4, Box 430K, Escondido, Calif. 92025

[22] Filed: May 7, 1973

[21] Appl. No.: 357,936

[52] U.S. Cl. .............................................. 239/542
[51] Int. Cl. ............................................ B05b 15/00
[58] Field of Search ........... 239/542, 271, 272, 145, 239/547; 138/42

[56] References Cited
UNITED STATES PATENTS

| | | | |
|---|---|---|---|
| 3,586,239 | 6/1971 | Blass | 239/542 |
| 3,667,685 | 6/1972 | Rinkewich | 239/542 |
| 3,729,142 | 4/1973 | Garza et al. | 239/542 |

Primary Examiner—Lloyd L. King
Attorney, Agent, or Firm—Knobbe, Martens, Olson, Hubbard & Bear

[57] ABSTRACT

A drip emitter device for plant subsoil irrigation having a flexible tubular coupling into which a threaded control rod is slidably fitted. The interior surface of the resilient coupling is smaller than the outside diameter of the threads of the rod, resulting in a secure contact in a biased manner between the coupling and the rod to form a helical flow path. The coupling is transparent to allow observation of possible clogging within the threaded channel. The contact between the rod and the coupling is slideably adjustable. The drip rate exiting the emitter is controlled by the readily adjustable longitudinal position of the control rod within the flexible coupling. The control rod is removable from the coupling to allow easy and fast cleaning of the threaded channel.

11 Claims, 3 Drawing Figures

PATENTED SEP 3 1974

3,833,176

DRIP EMITTER DEVICE

BACKGROUND OF THE INVENTION

This invention relates to a field of subsoil plant irrigation and more particularly discloses a type of emitter for use in a subsoil plant irrigation system. Commonly, present irrigation for agricultural land utilizes systems of surface irrigation through the use of some type of a sprinkler system or by flooding or channeling surface water adjacent crops. In either case the efficiency as to the total amount of water delivered versus that actually utilized by the plant or crop is quite low, resulting in relatively large expense in the provision of adequate water. Much of the inefficiency is caused by evaporation, since most areas requiring irrigation are characterized by an arid environment.

A recent development in the area of agriculture is drip irrigation which has been cited as having the greatest potential impact on the agricultural industry since the development of surface sprinkler systems. The drip irrigation concept concentrates on the elimination of surface evaporation by the slow continuous drop by drop introduction of water to the ground adjacent the plant which will eventually maintain a moist subsoil environment in which the plant will thrive. The ground surface remains dry except at the point of the introduction of the water; therefore, the evaporation losses are minimized. Experience with the use of drip irrigation has demonstrated that the quantity of water necessary has been cut nearly in half while the quantity and quality of crops has been significantly increased. Also, the growth of undesirable weeds adjacent the crops is greatly diminished, because little surface water is available for their survival.

The drip irrigation system, however, is not devoid of problems. The first drawback is that in order to provide an adequate drip irrigation system, a separate drip emitter is needed for each plant and, in the case of trees, several emitters may be necessary for each tree. Consequently, great quantities of emitters are necessary for large scale agricultural production. The prior art devices reflecting drip irrigation emitters are rather complex in construction, resulting in a prohibitive cost for most farmers because of the vast quantities of emitters necessary. These prior art designs involve complicated components produced by the use of sophisticated machinery, producing certain machine tolerances on the components. These factors lead to the high unit cost.

Another disadvantage of a drip irrigation system are the constant maintenance problems in keeping the emitters free from clogging. Since the flow rate in the supply lines and into the emitters is very low, and since the channel for drip flow in the emitters is very small, the system is unable to flush or cleanse itself, resulting in the frequent occurrence of clogging in the small channel of the emitter. Prior art devices disclose rather complicated emitters which require a time consuming process for flushing the emitter free of the clogging material. Also these devices do not provide for the ability to easily observe the point where possible clogging is developing. Therefore, only when the emitter ceases its flow is clogging recognized.

Because the line pressure for the water supply is low, problems are encountered with drip irrigation systems where the terrain varies to such an extent that the pressure is not sufficient to promote the necessary flow in emitters located on higher terrains. Prior art devices have no provision to adjust the rate of flow exiting each emitter in order to compensate for the elevation differences.

BRIEF SUMMARY OF INVENTION

The invention disclosed herein comprises a flexible tubular coupling into which a threaded rod is inserted. The contact of the smooth interior surface of the flexible coupling and the threaded rod results in a helical channel or flow path for the slow emission of the water. The flexible coupling, having a smaller internal size than the outside diameter of the threads, is biased against the threads of the rod to maintain a secure connection, requiring no additional sealing component or compound. The rod is slideably removable from the flexible coupling as well as being variably positioned longitudinally in the flexible coupling. The coupling is transparent on the end where the threaded rod is received.

The present invention provides a simplified and inexpensive drip irrigation emitter. Through the use of this invention a person can install drip irrigation without prohibitive initial costs.

The uncomplicated nature of the invention is the basis for its many advantages relating not only to cost, but also to operation. Because the threaded rod is removably biased within a smooth interior surface of a flexible coupling, maintenance and operating procedures are greatly simplified.

Because the flexible coupling is transparent adjacent the connection with the rod, ready observation is possible of the location of any possible clogging developing within the flow channel. If clogging is noted within the emitter, the threaded rod is easily removed by pulling or sliding it out of the flexible coupling and flushing the clogging material off the rod. The rod is then replaced by sliding it back into the flexible coupling. Such an operation will require only a few seconds of time.

Another advantage of the present invention is the ability to quickly and easily adjust the drip rate to conform to the needs of a particular plant or terrain location of the emitter. As stated previously, the terrain of an agricultural farm may vary significantly and the low pressure flow of water in the lines can result in those emitters at higher elevations having a lesser drip rate than desired. Since the extent to which the threaded rod is placed within the flexible coupling determines the length of the resistive helical channel through which the water must pass, the drip rate can be varied by the amount of contact between the threads and the interior surface of the flexible coupling. This contact can be easily adjusted because the threaded rod is simply held within the flexible coupling by the resilience of the flexible coupling. Therefore, the threaded rod can be pushed in or pulled out as much as necessary to vary the drip rate as required.

These and other advantages will become more readily apparent after a review of the drawings and the detailed description below.

DETAILED DESCRIPTION OF INVENTION

Figure 2:
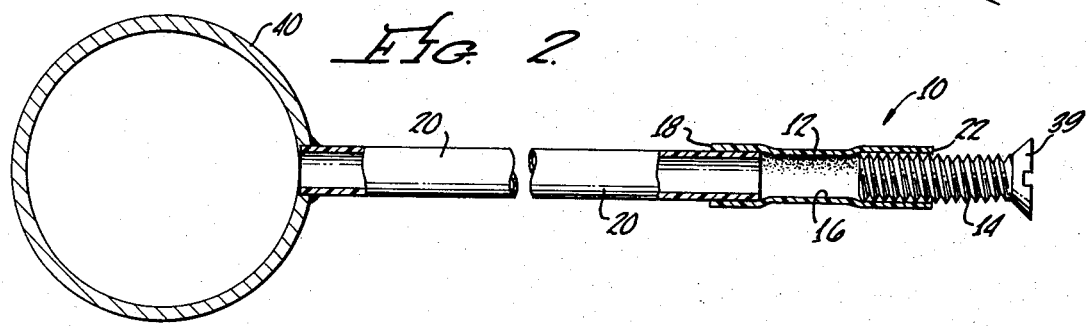
FIG. 2 is a sectional view of the drip emitter connected to the supply line.
Figure 3:
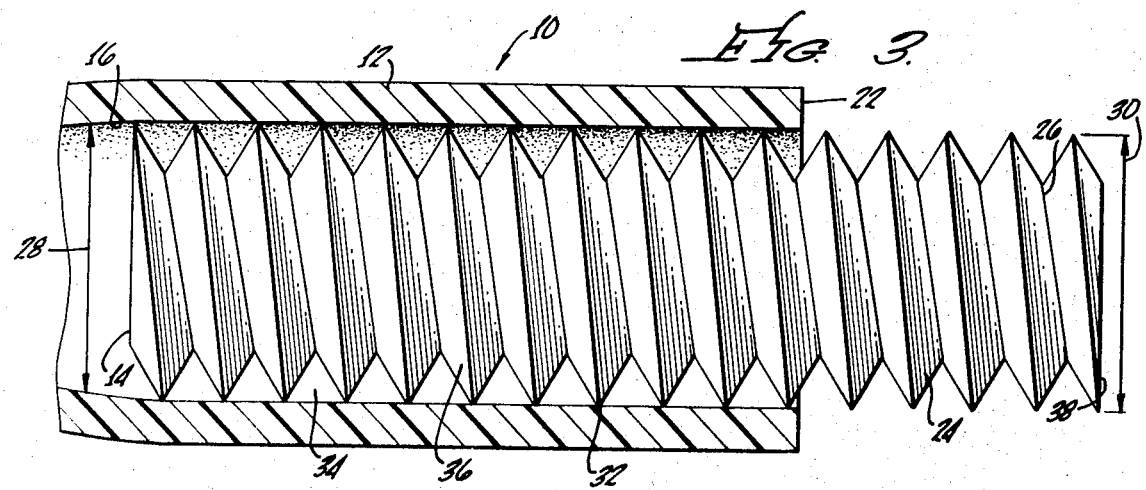
FIG. 3 is a detailed sectional view of the drip emitter device.

Referring to FIG. 2 the valve or drip emitter device 10 for irrigation is shown in detail. The drip emitter 10 comprises a valve body or resilient tubular coupling 12 and a threaded channel member or control rod 14. The coupling 12 has a smooth interior surface 16 and engages at one end 18 with a branch tube 20 and with the valve member or channel member 14 at the other end 22. Referring to FIG. 3, the channel member 14 is a cylindrical member with its outer surface 24 comprised of exterior threads 26. The inside diameter 28 of the coupling 12 is slightly smaller than the outside diameter 30 of the threads 26, resulting in the apex 32 of the threads 26 tightly engaging the smooth interior surface 16 of the coupling 12 to cause a liquid seal between the apex 32 of the threads 26 and the interior surface 16 of the coupling 12. The contact between the interior surface 16 of the coupling 12 and the apex 32 of the threads 26 forms a continuous helical channel or passage 34 between the surface 36 of the threads 26 and the interior surface 16 of the coupling 12.

Because the coupling 12 is resilient and has a smooth interior surface 16 the placement of the channel member 14 within the coupling 12 can be accomplished with relative ease by simply sliding the channel member 14 into the coupling. Although the channel member 14 has threads 26, there is no requirement for having to turn the channel member 14 in the manner similar to a screw in order to insert it into the coupling 12. The smooth interior surface 16 of the coupling 12 promotes the relative ease in sliding the channel member 14 into the coupling. Also, since the coupling is resilient and the threads 26 of the channel member 14 are slightly larger than the interior size of the coupling 12, the coupling exerts a slight bias against the apex 32 of the threads 26 to provide a liquid seal contact.

Figure 1:
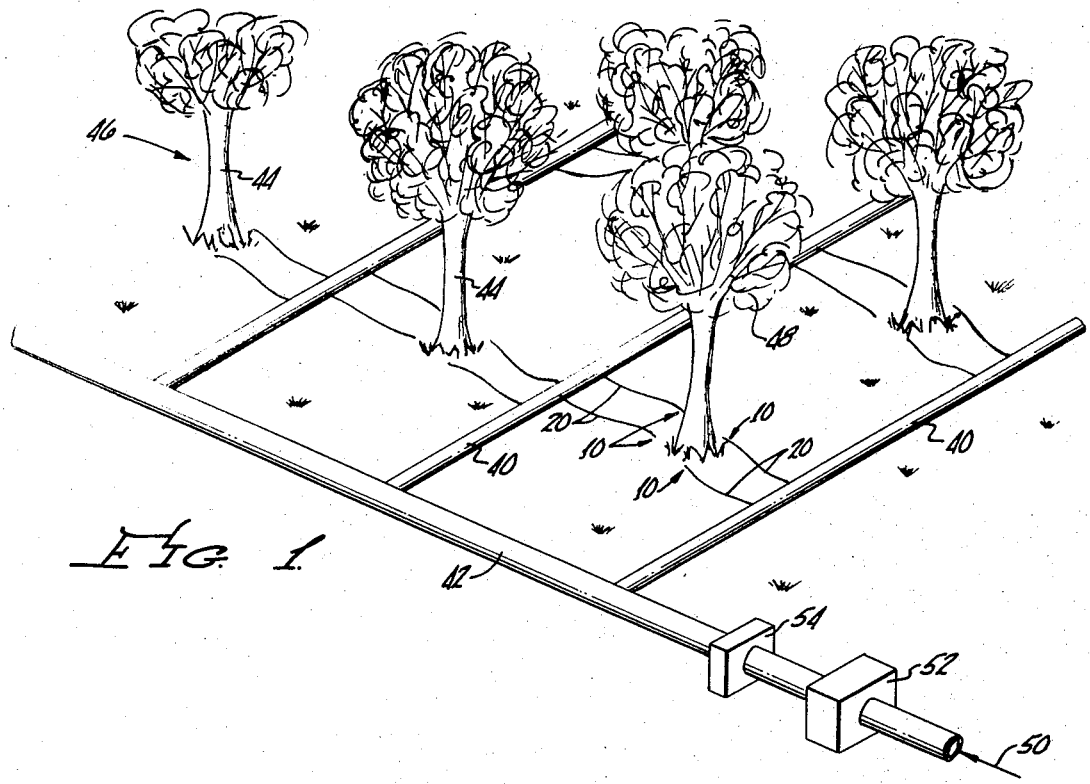
FIG. 1 is a prospective view of agricultural plantings with the drip emitter irrigation system in use.

In one embodiment of the channel member the exposed end 38 is in the form of a typical screw head 39 as shown in FIG. 2 for easier grasping to move the channel member within the coupling. The branch tube 20 is connected to a feeder line 40, which in turn is connected to the main supply line 42 as shown in FIG. 1. The coupling 12 is fabricated from a resilient flexible material to allow the insertion of the larger diameter threaded channel member 14. Although a separate coupling 12 is the preferable arrangement, the drip emitter 10 can be constructed with only the engagement of the branch tube 20 and the channel member 14 so long as the branch tube 20 is resilient with a smooth interior surface smaller than the threads of the channel member 14.

In practice the plant drip emitter irrigation system is arranged as shown in FIG. 1. The arrangement reflected in FIG. 1 is primarily for use with trees 44 and more specifically citrus trees. At one edge of the orchard 46 is the main supply line 42 from which feeder lines 40 extend through the orchard between the rows of trees 44. Connected to the feeder lines 40 adjacent each tree are branch tubes 20 which place a set of drip emitters 10 in the area of each tree 44. As shown in FIG. 1, practice has proven that four drip emitters 10 should be placed around each tree at the periphery of the foliage 48 to provide adequate irrigation.

The operation of the drip emitter or nozzle 10 is accomplished by the introduction of low pressure water 50, approximately 8 pounds, into the main supply line 42 which is regulated by a pressure regulator 52. The maintenance of the proper fluid pressure within the system is very critical to its successful operation. Since the fluid or water is flowing at a very low rate, it lacks the ability to adequately flush the clogging particles out of the pipe lines and the drip emitter; therefore, a filter 54 in normally placed in the system.

The water reaching each of the drip emitters 10 will follow the channel 34 formed between the channel rod 14 and the coupling or throat member 12 and will exit the emitter 10 at the preferred slow rate of about 1 quart per half hour. Since the helical channel 34 is a resistive flow path which slows the flow of the water, the extent that the channel rod 14 is pushed into the coupling 12 controls the amount of flow. The further the rod 14 is slideably engaged within the coupling 12, a longer resistive passage 34 is produced, slowing the emission of the water. The opposite is true when the rod 14 is pulled further out of the coupling 12. Because the coupling 12 is made of a resilient material, it is possible to easily adjust the flow rate by hand by moving the rod 14 in or out as desired. This ability to adjust the flow for each emitter 10 is quite important, since various places in the orchard may be at higher elevations causing pressure reductions which decrease flow; and, therefore, the rod 14 can be pulled out of the coupling 12 enough to compensate for the reduced pressure.

In conjunction with the ease of the movement between the slideably engaged rod 14 and coupling 12 is the advantage of easy flushing of the channel 34 if the emitter 10 should become clogged, which is quite possible due to the small flow channel 34. Preferably, the coupling 12 is made of clear transparent material, so that it is possible to quickly observe or perceive clogging within the emitter 10 as well as the position of the rod 14 within the emitter 10.

What is claimed is:

1. A drip irrigation device comprising:
   a resilient coupling with a smooth surface and having one end connected to the fluid supply; and
   a grooved rod slideably biased with the other end of said coupling, said contact between said smooth surface of said coupling and said rod forming a channel for the flow of the fluid, the longitudinal connection between said rod and said coupling being adjustable to change the rate of flow of said fluid, said grooved rod having external threads, the outside diameter of said threads being greater than the inside diameter of said resilient coupling, resulting in a biased liquid seal of said coupling on said threads.

2. A drip irrigation device as defined in claim 1 wherein said other end of said coupling is transparent to allow ready perception of possible clogging to said channel.

3. A drip irrigation device as defined in claim 1 wherein said slideably biased rod permits ready manual adjustment of said longitudinal connection between said rod and said coupling for variation of said flow rate.

4. A drip irrigation device as defined in claim 1 wherein said rod is slideably removable from said coupling to allow ready cleaning of said rod when clogging occurs.

5. A drip irrigation device as defined in claim 1 wherein said coupling comprises a flexible and non-corrosive material.

6. A drip irrigation device as defined in claim 1 wherein said rod comprises a non-corrosive material.

7. A plant irrigation valve for varying the emission of a liquid, said valve comprising:
- a resilient valve body connected to the liquid supply line, said valve body having a smooth cylindrical interior surface; and
- a threaded valve member slideably engaging said interior surface of said valve body, the apex of said threads in liquid seal contact with said interior surface of said valve body, said contact being the sole means for maintaining a predetermined longitudinal correlation between said threads and said interior surface providing a channel for flow of said liquid, said valve member having multi-longitudinal positions within said valve body, engaging the interior surface of said valve body in each such position, resulting in a variation of the flow rate of said liquid.

8. A plant irrigation emitter system for slow emission of a liquid, said system comprising:
- a branch line having one end connected to a liquid supply;
- a flexible coupling having an interior passageway of a first dimension in its unflexed condition and having a first end engaging the second end of said branch line; and
- a channel rod slideably engaged within the second end of said coupling, said engagement of said channel rod with said flexible coupling increasing said interior passageway to a second dimension larger than said first dimension forming a passage to create said slow emission from the flow from said liquid supply.

9. A plant irrigation emitter system as defined in claim 8, additionally comprising a pressure regulator connected to said liquid supply.

10. A drip irrigation device comprising a first and a second tubular member connected in axial alignment, said first tubular member having a channeled surface and said second tubular member having a smooth surface, said channeled surface and said smooth surface in juxtaposed relation with each other in said axial alignment connection forming a channel for the flow of a fluid, one of said first and second tubular members being of resilient material for holding said channeled surface and said smooth surface secure in a biased manner in said axial alignment connection in a biased manner along the axial surface contact between said first and second tubular members, one of said first and second tubular members having a larger exterior diameter than the interior diameter of the other of said first and second tubular member, wherein said larger exterior diameter member is received into said interior diameter member.

11. A drip irrigation device comprising a first and second concentric member, said first member having an inner surface in contact with an outer surface of said second member, forming a channel for the flow of a fluid, one of the inner and outer surfaces being threaded and the other of said inner and outer surfaces being smooth, one of said first and second members being resilient, said resilient member, through its resilience, assuring a seal along the contacting surface between said inner and outer surfaces, wherein the outer surface of said second member has an exterior diameter greater than the diameter of said inner surface of said first member.

* * * * *